United States Patent
Antilla et al.

[11] Patent Number: 5,259,021
[45] Date of Patent: Nov. 2, 1993

[54] TRANSMISSION OF INTERCONNECTION INFORMATION FOR NEXT GENERATION CORDLESS TELEPHONE NETWORKS

[75] Inventors: Gary A. Antilla, Plantation; Mark S. Stuglik, Margate; Felix W. Krupczynski, Fort Lauderdale; Stelios J. Patsiokas, Plantation; Frank E. Lambrecht, Hollywood; Brian K. Johnson, Planatation, all of Fla.

[73] Assignee: Motorola, Inc., Schaumburg, Ill.

[21] Appl. No.: 28,758

[22] Filed: Mar. 9, 1993

Related U.S. Application Data

[63] Continuation of Ser. No. 681,286, Apr. 8, 1991, abandoned.

[51] Int. Cl.[5] .................................... H04M 11/00
[52] U.S. Cl. .................................... 379/61; 379/58; 379/63; 455/58.2
[58] Field of Search .................. 379/58, 59, 60, 61, 379/62, 63, 134; 455/54.1, 58.2

[56] References Cited

U.S. PATENT DOCUMENTS

| | | | |
|---|---|---|---|
| 4,612,415 | 9/1986 | Zdonek et al. | 379/59 |
| 4,718,081 | 1/1988 | Brenig | 379/60 |
| 4,748,655 | 5/1988 | Thrower et al. | 379/58 |
| 4,768,218 | 8/1988 | Yorita | 379/61 |
| 4,833,702 | 5/1989 | Shitara et al. | 379/62 |
| 4,894,856 | 1/1990 | Nakanishi et al. | |
| 4,930,149 | 5/1990 | Matsushima | |
| 4,977,589 | 12/1990 | Johnson et al. | 379/58 |
| 4,982,441 | 1/1991 | Hashimoto et al. | |
| 5,020,095 | 5/1991 | Morganstein et al. | 379/134 |

*Primary Examiner*—Jin F. Ng
*Assistant Examiner*—Dwayne D. Bost
*Attorney, Agent, or Firm*—Juliana Agon

[57] ABSTRACT

A public telephone network to portable telephone interconnection device (20) is provided. At least one transceiver (30a-n) interconnects a plurality of portable telephones (12) to the public telephone network (16). A channel monitor (38) monitors the transceivers (30a-n and 82) to provide information. At least one information transceiver (82) interconnects the plurality of portable telephones (12) to and is responsive to the monitor (38) for transmitting (104) the information to the plurality of portable telephones (12).

15 Claims, 3 Drawing Sheets

TRANSMISSION OF INTERCONNECTION INFORMATION FOR NEXT GENERATION CORDLESS TELEPHONE NETWORKS

This is a continuation of application Ser. No. 07/681,286, filed Apr. 8, 1991 and now abandoned.

TECHNICAL FIELD

This invention relates generally to the field of portable or cordless telephones systems and more specifically to the monitoring of the communicating capability of the transceiver of these systems.

BACKGROUND ART

A portable telephone system, such as the second-generation digital cordless telephony (CT2), has multiple transceivers which are located at a call point station or public base station known as a telepoint. These transceivers allow persons using portable or wireless telephones to access the public telephone network when in range or within a service area.

However, a range of distances up to about 400 feet, depending on the surroundings, is possible. This distance, while providing a convenience as to where calls can be placed from also creates two new problems. Unlike today's "corded" phone booth where the caller has to actually reach it before a call can be placed, there is no indication of an in range condition until after the caller has failed to make a call in the wireless system.

Another problem is created when the caller, who is within range of the cordless telephone booth, but cannot acquire a dial tone to obtain an open line, since the transceivers of the base station can handle only a limited number of simultaneous phone calls made by different portable telephones. Because the caller does not know if one of the transceivers is available or they are fully utilized until the caller attempts to access the transceivers, it is frustrating for the caller to find that a transceiver is not available only after a phone call has been attempted. Even if a "busy" visual annunciator was available at the telepoint, if a caller is too far away or not within the line-of-sight of the annunciator, the caller would still not receive any busy indication.

Unlike today's "corded" phone booths, the callers wait in line and psychologically are prepared to wait, since they can see their placement in the queue. However, a cordless telepoint user on the other hand, is not prepared to wait, but is frustrated instead, since there is no indication of a queue line being formed.

Therefore, a need arises for handset or cordless telephone subscribers to obtain in range and busy information from CT2 base stations before their call attempts fail. Currently, losses of revenue may occur since the quantity of calls that could not be made, due to a busy base or telepoint condition is not tracked. Hence, there is also a need for a means of determining how many call requests were attempted during a busy hour to justify system expansion.

SUMMARY OF THE INVENTION

Accordingly, it is an advantage of the present invention to transmit a call point signal for indicating in range condition and/or the unavailability of a public telephone network from a portable telephone interconnection device (telepoint) to a wireless phone due to being "busy". Additionally, the telepoint can record whether it has reached its maximum number of interconnections.

Briefly, according to the invention, a public telephone network to portable telephone interconnection device is provided. At least one transceiver interconnects a plurality of portable telephones to the public telephone network. A channel monitor monitors the transceivers to provide information. At least one information transceiver interconnects the plurality of portable telephones to and is responsive to the monitor for transmitting the information to the plurality of portable telephones.

In one aspect of the invention, the availability of portable telephones to public telephone network interconnections is the information determined and provided.

In another aspect of the invention, the placement of the requesting portable telephones in a queue is the information determined and provided.

In a further aspect of the invention, the available transceiver or the information transceiver transmits information representing a calling back of the portable telephones in the queue.

In another aspect of the invention, the monitor monitors the transceivers to determine whether the portable telephones are within a service area of the transceivers.

DETAILED DESCRIPTION OF THE PREFERRED EMBODIMENT

Figure 1:
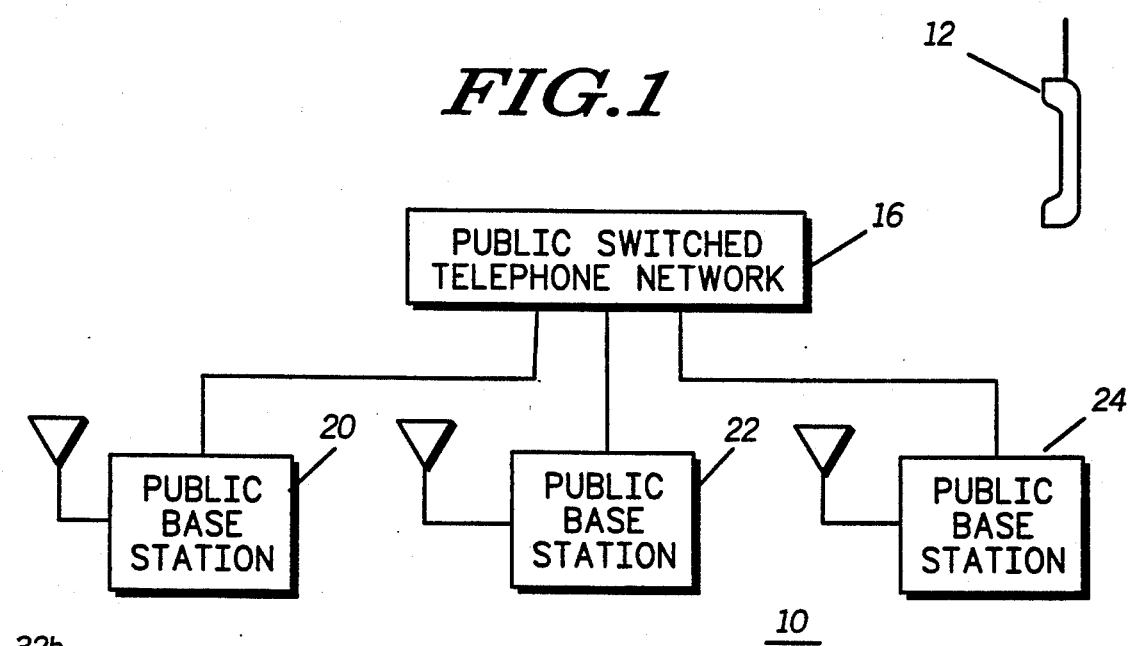
FIG. 1 conceptually shows a cordless telephone network in accordance with the invention.

Referring to FIG. 1, a communication system 10 for providing services to a plurality of subscribers (not shown) comprises a plurality of public base stations or CT2 call point stations 20, 22, and 24 and a plurality of wireless mobile subscriber units or cordless telephones (represented by a handset 12). A telephone system, for example, a public switched telephone network (PSTN) 16 allows subscribers to communicate with other telephone users. The present invention can work with any type of telephone system or network such as a public system (PSTN) or a private system. Private systems include a key system, a private branch exchange (PBX), or a private automated branch exchange (PABX).

Each subscriber can communicate with the PSTN 16 via the network of public base stations 20, 22, and 24. In this system, a voice connection is established by RF transmission from the cordless telephone handset 12 via the public base station or fixed device 20, 22, or 24 to a telephone set not shown (but accessible by the public switched telephone network 16).

Figure 2:
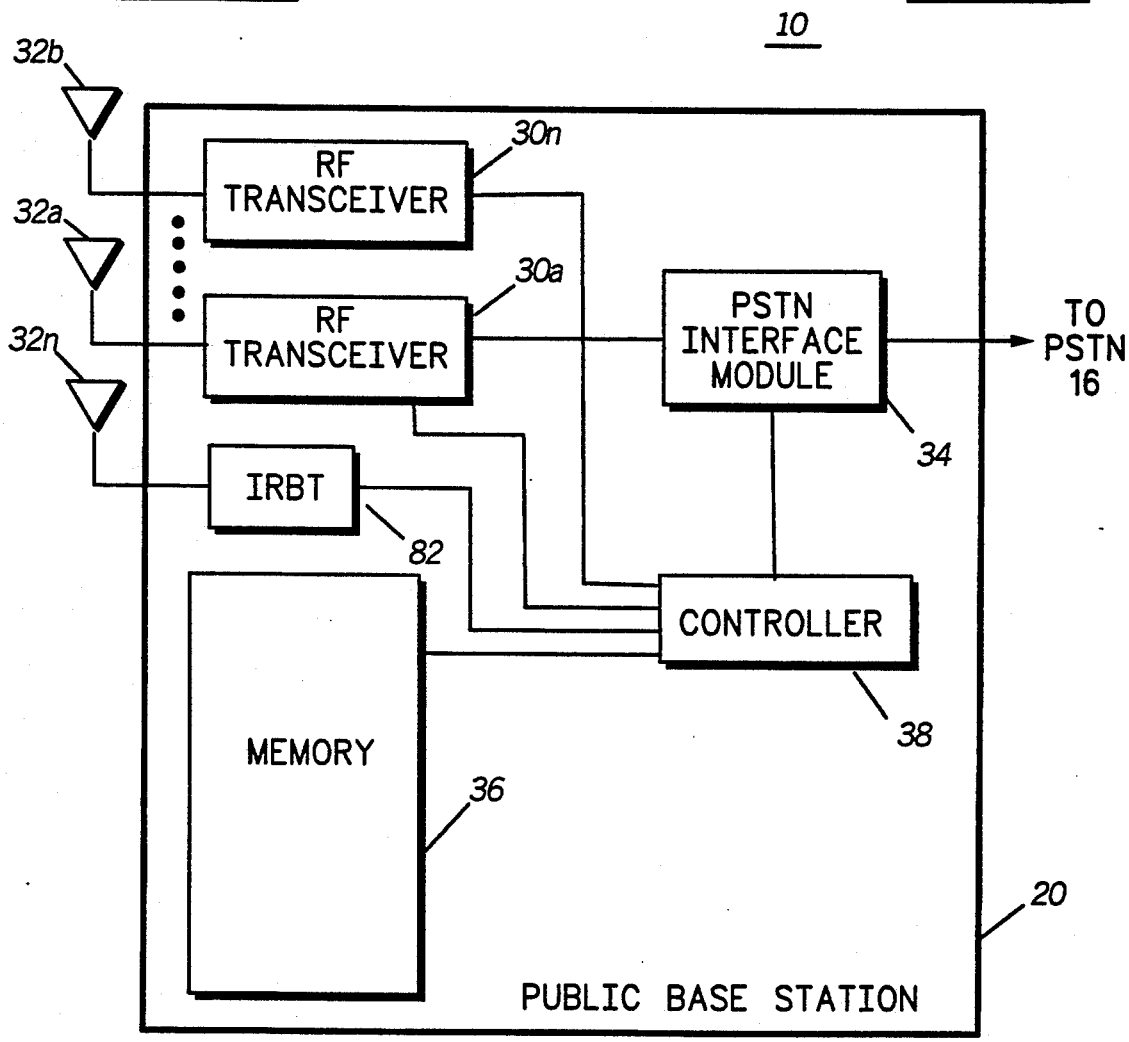
FIG. 2 shows a basic block diagram of a public cordless telephone base station in accordance with the invention.

Referring to FIG. 2, a public base station (or wireless phone booth or telepoint) 20, capable of receiving calls from the portable telephones 12, in accordance with the invention is shown in block diagram form. Each of the components of the wireless phone booth 20 represented by a block is conventional. A plurality of antennas 32a-n are each coupled to at least one RF transceiver or CT2 multi-channel radio frequency transceiver 30a-n for communication between the portable or wireless telephone handset 12, which includes a corresponding radio frequency transceiver 50 (see FIG. 3). The base station 20 also includes a memory 36 for storing information including memory templates containing information relating to subscribers such as their address codes or identifications and a controller or channel monitor 38 (e.g., a conventional microprocessor) for processing the information received from the transceivers 30a-n and 82 and/or the information stored in the memory 36. A part of the memory 36 may also provide call authentication and verification statistic functions.

A PSTN interface module 34 provides an interface between the public telephone network 16 and the transceivers 30a-n via phone lines coupled between the transceivers 30a-n and the PSTN interface module 34. The CT2 multi-channel transceiver activity is monitored by the controller or the channel usage monitor 38. The channel usage monitor controller 38 determines whether or not the CT2 multi-channel transceiver 30a-n is utilizing all of its predetermined number of phone lines. When such a phone line is granted by the controller 38, a dial tone will also be transmitted to the handset 12 by one of the transceivers 30a-n.

Given a set number of phone lines, the CT2 call point or base station 20 can handle only a predetermined number of interconnections or phones lines for portable or wireless telephone handsets 12 within its transceiving area or range. As a result, a portable or wireless telephone 12 attempting to place a call after the predetermined number of interconnections or phone lines have been made will not be able to connect to the public telephone network 16 via a phone line coupled between one of the available transceivers 30a-n and the PSTN interface module 34 as permitted by the controller 38 and a dial tone will not be received by the handset 12 from the transceiver 30a-n.

To provide more status information, the present invention provides at least one additional transceiver called an in range and busy transceiver (IRBT or IRB transceiver) 82 which is incorporated in the base station 20 for the purpose of communicating "in range" and "busy status" to those subscriber handsets 12 that are adapted to receive the information and correspondingly indicate the information. Along with the controller 38, the IRBT 82 provides helpful statistics regarding system traffic which will aid in planning for system expansion. The same IRBT 82 could also be used for queuing and call back purposes.

The IRBT 82 is under the control of the base station's main controller 38 and is also connected to the antenna 32n. The main controller 38 continually updates the IRBT 82 with information on telephone line availability and/or the frequencies or channels in use. Based on this information the IRBT 82, the channels or frequencies in use will be neglected during its scan by the IRBT 82. The IRBT 82 continuously scans the remaining free channels looking for requests for range or line availability requests from the handset 12.

The data continuously collected by the IRBT base station controller 38 concerning the quantity of calls that could not be made due to a base busy condition is also stored in the memory 36. This information can be used to justify upgrades of the base station for additional phone lines. Especially in heavy traffic areas, additional IRBT's 82 can be added and will therefore be even more useful in obtaining information for expansion, since a busy unrecorded base station will never know of additional attempts that could not be completed.

Figure 3:
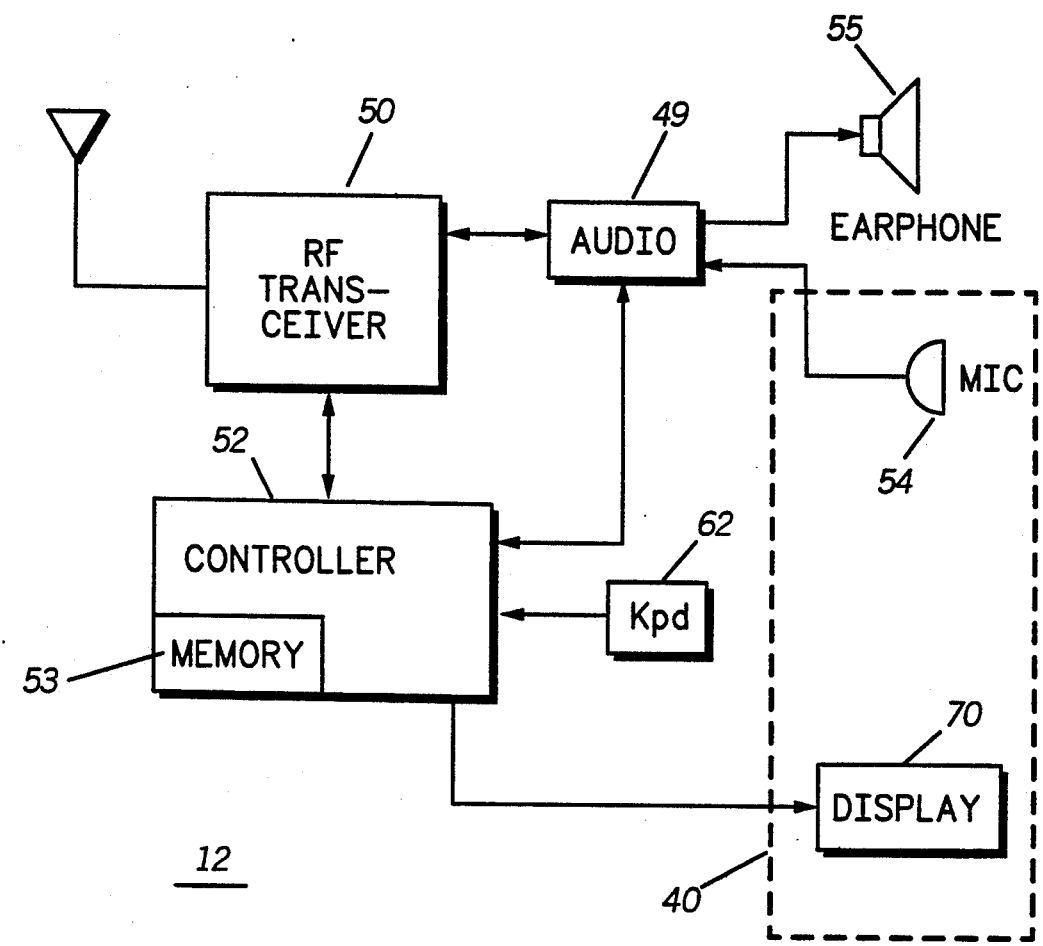
FIG. 3 shows a block diagram of a cordless telephone in accordance with the invention.

Referring to FIG. 3, a cordless handset 12 in accordance with the invention is shown. Basically, within the system 10 of FIGS. 1 and 2, the base station 20, 22, or 24 performs connection control based upon a request received from the handset 12. The base station 20, 22 or 24 further transmits data information to the handset 12. Operating as a means for requesting and subsequently receiving a dial tone for a phone line connection in the base station 20, the cordless telephone handset (or wireless mobile subscriber unit) 12 comprises a conventional radio transceiver 50. As the mastermind of the handset 12, a controller 52 includes memory 53 containing the address or identification of the handset 12, the subscriber unit ID number, and/or other system operation parameters. A keypad 62 allows the user to type commands or information requests to the public base station 20 such as dialing a number sequence to request information about range or availability or as conventionally, to request a phone line connection.

The cordless telephone handset 12 further comprises an audio section 49 connected to an earphone 55 and a microphone 54. A display 70 may provide the user with range or availability information to determine when the phone line will not be connected to disallow the call. An indicator 40, comprising the display 70 or the microphone 54, or some other suitable indication means, is responsive to the information gathered by the channel monitor controller 38 and transmitted by the IRB transceiver 82. The indicator may be an annunciator or a light that is observable on the handset 12, a synthesized voice message provided by the earphone 55, or a message or symbol displayed on the display 70 of the handset 12.

The user of the portable telephone 12 can determine if the call will not be connected to the public telephone network 16 by observing the indication means or indicator 40 for representing phone line unavailability or an out-of-range indication. If no "in range" message is received, the handset can interpret this absence as and provide an indication 40 of "out-of-range".

If the channel monitor or controller 38 of the base 20 determines that the maximum number of phone lines are currently being utilized, the indicator 40 at the handset 12 will indicate that the call point is busy by lighting a busy sign or otherwise representing such a message. Based on past statistics, the user may receive a message about the waiting time from the IRBT 82. In addition, the IRBT 82 may place the user in queue and call him or her back when a line is available. Depending on the circumstances then, the user either waits for the indicator 40 to indicate that a channel is available, waits for a call back or travels to another CT2 call point station. While the preferred embodiment essentially utilizes a "busy" indication, an "available" indication could also be utilized for this purpose.

On the other hand, if the maximum number of portable telephone line connections are not being utilized and the handset 12 is in range, a dial tone will be received or alternately, an available indicator may be turned on.

Figure 4:
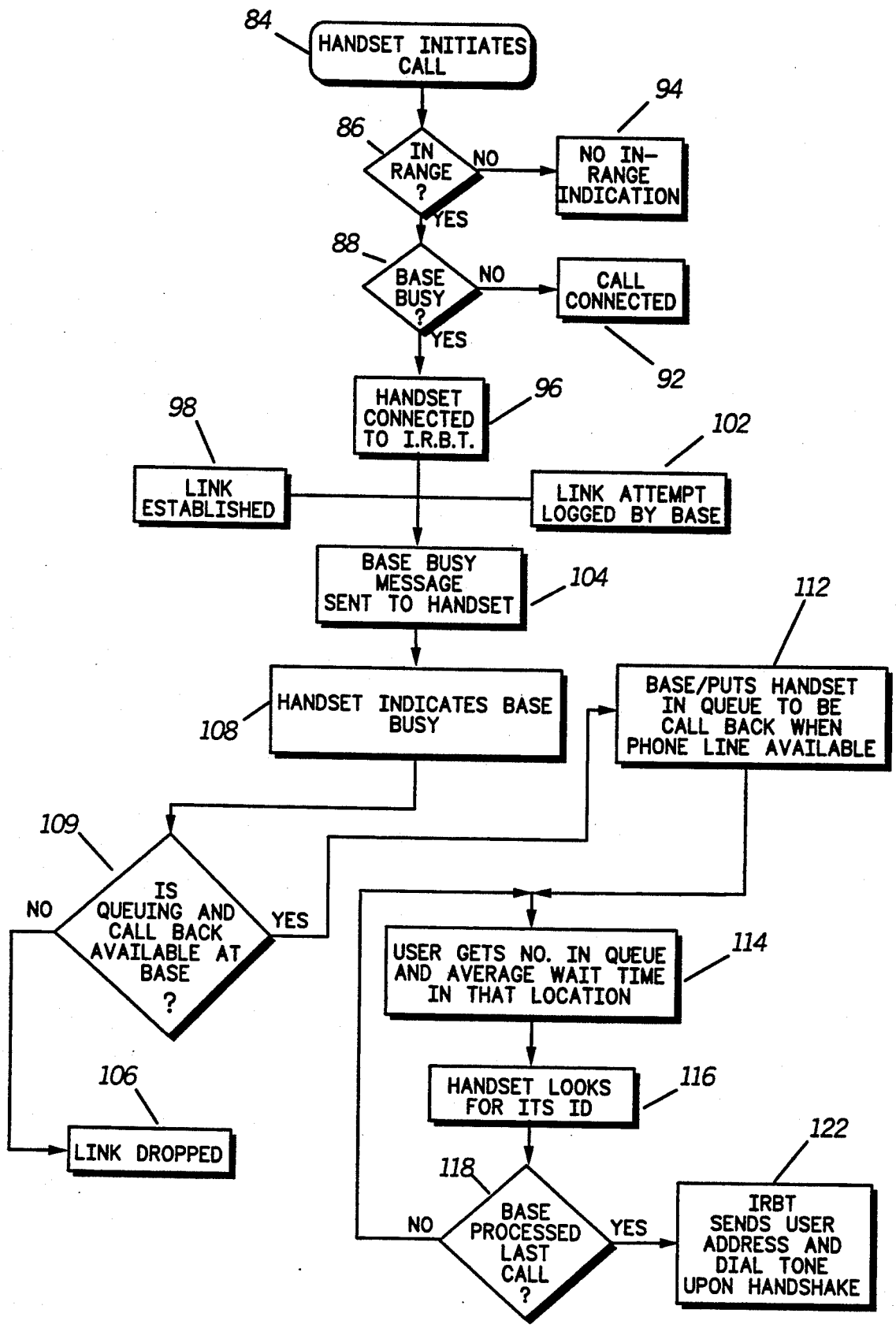
FIG. 4 is a system flow-chart in accordance with the present invention.

FIG. 4 shows a flowchart of the system operation in accordance with the present invention. An initiating block or step 84 is the starting point of the routine for monitoring interconnect availability and controlling the indicator 40 at the handset 12 by information transmitted by the IRB transceiver 82. In normal operation, a key press sequence (84) is initiated by the handset subscriber to attempt to obtain a link or phone line access via a keypad 62. In step 88, the base channel monitor controller 38, responsive to the CT2 multi-channel radio frequency transceiver 30a-n, determines whether the transceiver 30a-n is fully utilizing its predetermined number of phone lines available for interconnecting the portable telephones 12 to the public telephone network 16.

If the handset 12 is in range and the base 20 is not busy, and hence a line is available, the user or subscriber receives a dial tone and a call is connected in step 92 after the "yes" path is taken from the "in range" decision block 86 and the "no" path branch is taken from the "base busy" decision block 88. Hence, when a phone line is available, the subscriber would establish the link with one of the base transceivers 30a-n and the phone call would be connected (92) as in an normal CT2 operation. Since the CT2 multi-channel transceiver 30a-n has not exceeded its predetermined number of phone line interconnections, the indicator 40 at the handset 12 need not be turned "On".

When phone lines are available, the IRB transceiver 82 need only respond to requests for in range information, since the handset 12 can automatically obtain a link as in normal operation. To determine if the subscriber is within range of an IRBT equipped base station 20, a unique key press sequence via the keypad 62 or some other suitable method may be initiated. This unique key press sequence can also be automatically initiated by the hand set 12 for continuous monitoring of the "in range" condition, if the unit was so pre-programmed in the controller 52. Thus, a handset 12 can request in range information at any time and will not tie up a phone line since the IRBT 82 is not connected to the PSTN 16. Any available transceiver 30a-n not currently connecting another subscriber's handset to a phone line aside from the IRBT 82 could also momentarily grant a link (98) and provide the handset 12 with the message "in range" or a representation thereof as for the busy indication.

Alternately, no "in range" indication need be given since the phone line could then be connected and a dial tone provided to indicate "link established". This ability of the handset 12 to momentarily obtain a link before a phone line connection is made will allow the subscriber to determine range status with an IRBT equipped base station by the use of the "in range" indication.

Since the base is not busy, as determined by the decision block 88, but the call is not connected as evidenced by the lack of a dial tone or an "in range" transmission, the out-of-range indication of step 94 will be provided by the handset 12 after taking the "no" branch from the "in range" decision block 86.

If the CT2 multi-channel transceiver 30a-n is fully utilizing its predetermined number of phone lines, the indicator 40 is turned "on" at step 108 upon a message sent to the handset 12 by the IRB transceiver 82 in step 104. Since all the phone lines are busy as determined by the controller 38 in decision block 88, and therefore all base transceivers 30a-n are in use, the IRBT 82 will establish a link with the subscriber (98) and transmit (104) the message "all lines are busy" to the handset 12. In this case where the base is busy, and the handset is in range, satisfying both "yes" branches from the decision blocks 86 and 88 respectively, the handset 12 is connected to the IRBT 82 in step 96 by establishing a link between the handset 12 and the IRBT 82 in step 98. Additionally, the link attempt is logged by the base controller 38 in step 102. Meanwhile, a base busy message is transmitted by the IRBT 82 to the handset 12 in step 104.

After the message is sent and received, the link is dropped from the IRBT 82 to the handset 12 in step 106 if the queuing and call back functions are not available at the base (109). Meanwhile, the handset 12 will receive the message, decode it, and indicate the information (108) of some kind of base busy representation via many possible paths 40, either though a synthesized message outputted by the earphone 55 or visually displayed by the display 70. Optionally, an auto retry procedure may also be initiated in step 108.

Alternately, if queuing and call back are available at the base as determined by decision block 109), the base controller 38 may place the address of the handset 12 in a queue for the handset 12 to be called back when a phone line is available in step 112. The rest of the flow chart describes a signalling protocol to eliminate the uncertainty of the availability of a wireless phone booth by providing the subscribers with queuing information. A predetermined time interval between calls is used to obtain all queuing information. Since the traffic statistics are available at the base station controller 38 and based on past performance, the handset subscribers can receive an average waiting time before their call will be processed, as calculated by the controller 38 and transmitted to the handset 12 via the IRBT 82. The user gets a number in queue and an average weight time calculated by the controller 38 in that location as transmitted by the IRBT 82 to the handset 12 in step 114. Hence, if the average waiting time is acceptable to the user, they remain at that location, if not, they try to find another IRBT equipped base station to provide them with similar status information or wait without knowing at non-IRBT equipped base stations.

In step 116, the handset 12 looks for its address code as transmitted by the IRBT or by one of the available transceivers 30a-n for a call back. The handset 12 returns to step 114 if the base 20 has not processed the last call as determined by a decision block 118 in the handset 12 since none of the transceivers 30a-n or 82 has responded yet.

On the other hand, if the base 20 has processed the last call, as determined by the decision block 118, one of the available transceivers 30a-n sends the user address (which was queued on a first in first out (FIFO) basis) and dial tone after linking with the handset 12 in step 122 and dropping the link with the IRBT 82.

In summary, the call point stations 20 are generally in public areas and have a substantially limited radio frequency coverage area. However, many people may be standing within the coverage area, some having and using portable telephones and others not. Thus, if not for this invention, the user would have no reasonable method of determining who is and who is not using the telephone system within the coverage area, and if the full capacity of the station is utilized. This invention thus provides the user with a convenient and accurate indication of the availability of the telephone system within the area in which it may be used.

What is claimed is:

1. A two-way communication system having a public telephone network to portable telephone interconnection device for allocating at least one communication channel, out of a plurality of predetermined radio communication channels, among a plurality of portable telephones, said interconnection device having the capability of interconnecting a predetermined maximum number of phone lines linked with a predetermined number of a radio communication channel subset of said plurality of predetermined radio communication channels, said system comprising:

each of said plurality of requesting portable telephones comprising:

transmitting means for transmitting a message representing a request to communicate on one of said radio communication channels;

means for receiving a signal representing a time duration approximation indicating an average phone-line access wait time estimate during which time other portable telephones may communicate prior to said requesting portable telephone being allowed to communicate; and means for indicating said average wait time estimate; and said public telephone network to portable telephone interconnection device comprising:

a predetermined corresponding plurality of transceiving means, operating over said subset, for providing communication links with said communication channel subset and said predetermined maximum number of phone lines and for interconnecting as many of said plurality of portable telephones to the public telephone network, as connectable, when one channel of said communication channel subset becomes available;

monitoring means for monitoring said communication links of said plurality of transceiving means with said phone lines to determine an availability of portable telephones to public telephone network interconnections for approximating how long is said wait time, based on past statistics, in order to provide said average wait time estimate for apprising a requesting user of said requesting portable telephone of said approximate duration until an available communication channel out of said subset becomes free; and information transceiving means, operating over said one of said plurality of predetermined radio communication channels, for interconnecting said portable telephone to and responsive to said monitoring means for transmitting information to said requesting portable telephone for indicating that the number of portable telephone to public telephone network interconnections equals said predetermined maximum number of phone lines, said information including said average wait time estimate, said information transmitted over said one of said communication channels not currently linked with said predetermined number of phone lines to serve as a temporary information link for receiving said request, said information transceiving means dropping said temporary information link with said requesting portable telephone when said available communication channel of said predetermined subset of communication channels becomes available to provide said grant to communicate.

2. The system of claim 1 further comprising in said public telephone network to portable telephone interconnection device:

memory means for logging said availability of portable telephones to public telephone network interconnections.

3. A two-way communication system having a public telephone network to portable telephone interconnection device for allocating at least one communication channel, out of a plurality of predetermined radio communication channels, among a plurality of portable telephones, said interconnection device having the capability of interconnecting a predetermined maximum number of phone lines, less than said plurality of predetermined communication channels, to a subset of requesting portable telephones within a service area operating over said maximum number of a radio communication channel subset, said system comprising:

each of said plurality of requesting portable telephones comprising:

transmitting means for transmitting a message representing a request to communicate on one of said radio communication channels;

receiving means for receiving a signal representing a time duration approximation indicating an average phone-line access wait time estimate during which time other portable telephones may communicate prior to said requesting portable telephone being allowed to communicate; and indicating means for indicating said average wait time estimate; and said public telephone network to portable telephone interconnection device comprising:

a predetermined corresponding plurality of transceiving means operating over said radio communication channel subset for providing a corresponding number of communication links for linking said communication channel subset with said predetermined maximum number of phone lines and for interconnecting as many of said plurality of portable telephones within said service area to the public telephone network, as connectable, when one channel of said communication channel subset becomes available;

monitoring means for monitoring said communication links of said plurality of transceiving means with said phone lines to determine an availability of portable telephones to public telephone network interconnections for approximating how long is said wait time, based on past statistics, in order to provide said average wait time estimate for apprising a requesting user of said requesting portable telephone of said approximate duration until an available communication channel out of said subset becomes free; and information transceiving means, operating over said one of said plurality of predetermined radio communication channels, for interconnecting said requesting portable telephone to and responsive to said monitoring means for transmitting information to said requesting portable telephone for indicating that the number of portable telephone to public telephone network interconnections equals said predetermined predetermined maximum number of phone lines, said information including said average wait time estimate, said information further includes an in range message to said requesting portable telephone requesting said in range message when said requesting telephone is within said service area.

4. The system of claim 3 wherein said indicating means include means for generating and indicating an out-of-service representation when said receiving means did not receive said in range message after said request was transmitted.

5. A cordless communication system having a public telephone network to portable telephone interconnection device for connecting a plurality of portable telephones to a public telephone network operating over a predetermined number of a radio communication channel subset of a plurality of predetermined radio communication channels, said system comprising:

a requesting portable telephone comprising:

transceiver means for transmitting a message representing a request for communicating with said public telephone network and for receiving information from said public telephone network to portable telephone interconnection device for indicating how long of an average wait time estimate for phone-line access, prior to said request of said requesting portable telephone will be granted on one channel of said predetermined subset of communication channels;

indicating means for representing said information as an approximate duration of said wait time until one channel of said communication channel subset becomes available for said portable telephone to be allowed to communicate; and said public telephone network to portable telephone interconnection device comprising:

a predetermined corresponding plurality of transceiving means for providing said communication channel subset and interconnecting as many of said plurality of portable telephones to the public telephone network, as connectable, when one channel of said communication channel subset becomes available;

monitoring means for allocating at least one communication channel of said subset among said plurality of portable telephones to be used with said plurality of transceiving means and for monitoring a usage of said transceiving means for determining how long is said wait time, based on past statistics, to provide said information including said average wait time estimate for apprising a requesting user of said requesting portable telephone of said approximate duration until an available communication channel out of said subset becomes free;

interfacing means for providing a predetermined number of phone lines corresponding to said predetermined number of said subset of communication channels for connecting one of said plurality of portable telephones to the public telephone network when one of said transceiving means is available, responsive to said monitoring means; and information transceiving means for interconnecting said requesting portable telephone to and responsive to said monitoring means for transmitting said information to said requesting portable telephone over one of said communication channels not currently linked with said predetermined number of phone lines to serve as a temporary information link for receiving said request, said information transceiving means dropping said temporary information link with said requesting portable telephone when said available communication channel of said subset of communication channels becomes available.

6. The cordless communication system of claim 5 wherein said information transceiving means includes scanning means for scanning the remaining free channels of said plurality of predetermined communication channels to receive said request.

7. The cordless communication system of claim 5 wherein said public telephone network to portable telephone interconnection device comprises a public base station operating in accordance with the standard protocol of the second-generation digital cordless telephony (CT2).

8. A two-way communication system having a public telephone network to portable telephone interconnection device for allocating at least one communication channel among a plurality of portable telephones, said system comprising:

a requesting portable telephone comprising:

transmitting means for transmitting a message representing a request to communicate;

means for receiving a signal representing a time duration approximation indicating an average phone-line access wait time estimate during which time other portable telephones may communicate prior to said requesting portable telephone being allowed to communicate; and means for indicating said average wait time estimate; and said public telephone network to portable telephone interconnection device comprising:

a predetermined corresponding plurality of transceiving means for interconnecting a predetermined corresponding plurality of phone-lines from a corresponding number of said plurality of portable telephones to the public telephone network;

monitoring means for monitoring said transceiving means to determine said average wait time estimate approximating how long of a delay is required in order to grant the requests to communicate of other portable telephones prior to said request of said portable telephone and to provide information, said information including said average wait time estimate; and information transceiving means receiving said message representing said request to communicate and for interconnecting said requesting portable telephone to and responsive to said monitoring means for transmitting said information including said average wait time estimate to said requesting portable telephone.

9. The system of claim 1 wherein said monitoring means includes memory means for storing traffic statistics of said plurality of transceiving means previously monitored to determine the average wait time estimate before availability of a portable telephone to public telephone network interconnection.

10. The system of claim 1 wherein
said monitoring means comprises monitoring means for monitoring said information transceiving means receiving said request for providing a in-service determination if said requesting portable telephone is within a service area of said information transceiving means, in order for said information transceiving means to transmit said information, including said in-service determination to said requesting portable telephone.

11. The system of claim 1 wherein said monitoring means comprises means for determining a placement of said requesting portable telephone in a queue.

12. The system of claim 11 wherein said at least one information transceiving means transmits said information representing a calling back of said requesting portable telephone in said queue.

13. The system of claim 11 wherein said at least one information transceiving means transmits said information representing a calling back of said requesting portable telephone in said queue if all of said predetermined plurality of phone-lines are unavailable.

14. The system of claim 13 wherein said transmitting means comprises means for transmitting a request for an in service area determination.

15. The system of claim 14 wherein said at least one information transceiver means comprises means for transmitting said in service area determination, responsive to receiving said request for said determination.

* * * * *